(12) United States Patent
Zhang et al.

(10) Patent No.: US 9,967,080 B2
(45) Date of Patent: May 8, 2018

(54) TECHNIQUES FOR MANAGING MEDIUM ACCESS TO MULTI-CHANNELS OF A SHARED RADIO FREQUENCY SPECTRUM BAND

(71) Applicant: QUALCOMM Incorporated, San Diego, CA (US)

(72) Inventors: Xiaoxia Zhang, San Diego, CA (US); Srinivas Yerramalli, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 15/151,648

(22) Filed: May 11, 2016

(65) Prior Publication Data
US 2016/0366689 A1    Dec. 15, 2016

Related U.S. Application Data

(60) Provisional application No. 62/173,559, filed on Jun. 10, 2015.

(51) Int. Cl.
| | |
|---|---|
| *H04W 4/00* | (2018.01) |
| *H04L 5/00* | (2006.01) |
| *H04W 16/14* | (2009.01) |
| *H04W 74/08* | (2009.01) |
| *H04W 74/02* | (2009.01) |

(52) U.S. Cl.
CPC ........... *H04L 5/0091* (2013.01); *H04W 16/14* (2013.01); *H04W 74/0808* (2013.01); *H04W 74/02* (2013.01)

(58) Field of Classification Search
None
See application file for complete search history.

(56) References Cited

U.S. PATENT DOCUMENTS

| | | |
|---|---|---|
| 2015/0049715 A1 | 2/2015 | Yerramalli et al. |
| 2015/0071060 A1 | 3/2015 | Bhushan et al. |

(Continued)

OTHER PUBLICATIONS

ISA/EPO, International Search Report and Written Opinion of the International Searching Authority, Int'l. App. No. PCT/US2016/032181, dated Jul. 25, 2016, European Patent Office, Rijswijk, NL, 9 pgs.

*Primary Examiner* — Anh-Vu Ly
(74) *Attorney, Agent, or Firm* — Dalei Dong; Holland & Hart LLP

(57) ABSTRACT

Techniques for performing listen before talk (LBT) procedures in networks having multiple channels within a shared radio frequency spectrum band are provided. These techniques may include determining a contention window size for a first LBT procedure to access a first channel of a shared radio frequency spectrum band, which may then be applied as the contention window size for a second LBT procedure to access a second channel of the shared radio frequency spectrum band. The contention window size may be determined based at least in part on one or more of a service priority or a channel type for data to be transmitted using the first channel. Performing the first LBT procedure may include determining that a recipient base station has reserved the first channel and the second channel, and performing the second LBT procedure for the second channel.

28 Claims, 14 Drawing Sheets

(56) References Cited

U.S. PATENT DOCUMENTS

| | | |
|---|---|---|
| 2015/0098397 A1 | 4/2015 | Damnjanovic et al. |
| 2016/0278088 A1* | 9/2016 | Cheng .................... H04L 47/27 370/328 |
| 2017/0019909 A1* | 1/2017 | Si ........................ H04W 76/048 370/328 |

* cited by examiner

TECHNIQUES FOR MANAGING MEDIUM ACCESS TO MULTI-CHANNELS OF A SHARED RADIO FREQUENCY SPECTRUM BAND

CROSS REFERENCES

The present application for patent claims priority to U.S. Provisional Patent Application No. 62/173,559 by Zhang et al., entitled "Techniques for Managing Medium Access to Multi-Channels of a Shared Radio Frequency Spectrum Band," filed Jun. 10, 2015, assigned to the assignee hereof, and is expressly incorporated herein in its entirety for all purposes.

BACKGROUND

Field of the Disclosure

The following relates to wireless communication, and more specifically to techniques for techniques for managing medium access to multi-channels of a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise referred to as user equipment (UE) devices. A base station may communicate with UEs on downlink channels (e.g., for transmissions from a base station to a UE) and uplink channels (e.g., for transmissions from a UE to a base station).

Some modes of communication may allow communication between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the shared radio frequency spectrum band is available. Additionally, a base station or a UE may communicate using multiple different channels of the shared radio frequency spectrum band, such as through the use of one or more component carriers, for example.

SUMMARY

The present disclosure, for example, relates to one or more techniques for performing listen before talk (LBT) procedures in networks having multiple channels within a shared radio frequency spectrum band. More particularly, the techniques relate to channel access on multiple channels within a shared radio frequency spectrum band when a contention window size for one or more of the channels may not correspond to a contention window size of one or more other channels within the shared radio frequency spectrum band. In some examples, a contention window size may be determined for a first LBT procedure to access a first channel of a shared radio frequency spectrum band, which may then be applied as the contention window size for a second LBT procedure to access a second channel of the shared radio frequency spectrum band. In some examples the contention window size may be determined based at least in part on one or more of a service priority or a channel type for data to be transmitted using the first channel. In some examples, performing the first LBT procedure may include determining that a recipient base station has reserved the first channel and the second channel, and performing the second LBT procedure for the second channel.

A method of wireless communication is described. The method may include determining a contention window size associated with a first listen-before-talk (LBT) procedure to access a first channel of a shared radio frequency spectrum band, and applying the contention window size for a second LBT procedure to access a second channel of the shared radio frequency spectrum band.

An apparatus for wireless communication is described. The apparatus may include means for determining a contention window size associated with a first listen-before-talk (LBT) procedure to access a first channel of a shared radio frequency spectrum band, and means for applying the contention window size for a second LBT procedure to access a second channel of the shared radio frequency spectrum band.

A further apparatus for wireless communication is described. The apparatus may include a processor, memory in electronic communication with the processor, and instructions stored in the memory, wherein the instructions are executable by the processor to determine a contention window size associated with a first listen-before-talk (LBT) procedure to access a first channel of a shared radio frequency spectrum band, and apply the contention window size for a second LBT procedure to access a second channel of the shared radio frequency spectrum band.

A non-transitory computer-readable medium storing code for wireless communication is described. The code may include instructions executable to determine a contention window size associated with a first listen-before-talk (LBT) procedure to access a first channel of a shared radio frequency spectrum band, and apply the contention window size for a second LBT procedure to access a second channel of the shared radio frequency spectrum band.

In some examples of the method, apparatuses, or non-transitory computer-readable medium described above, determining the contention window size may include identifying or determining whether one or more of a service priority or a channel type for data to be transmitted using the first channel, and determining the contention window size based at least in part on the identified one or more service priority or channel type. Additionally or alternatively, in some examples the contention window size may be determined to be shorter for data having higher service priority than for data having lower service priority.

In some examples of the method, apparatuses, or non-transitory computer-readable medium described above, the contention window size is determined to be shorter for data to be transmitted using a control channel than for data transmitted using a shared channel. Additionally or alternatively, in some examples the contention window size is determined to be shorter for shared channel data including channel condition information than for shared channel data without channel condition information.

Some examples of the method, apparatuses, or non-transitory computer-readable medium described above, one or more of the service priority or the channel type for data to be transmitted using the first channel may be different from the service priority or the channel type for data to be transmitted using the second channel. Additionally or alternatively, in some examples the second channel of the shared radio frequency spectrum band has one or more of a lower service priority or lower priority channel type than the first channel, and the contention window size may be determined based at least in part on a combination of the service priority or channel type of each of the first channel and the second channel.

In some examples of the method, apparatuses, or non-transitory computer-readable medium described above, the contention window size is determined based at least in part on a number of available channels in the shared radio frequency spectrum band, for which an LBT procedure is to be performed. Additionally or alternatively, in some examples the contention window size is determined based at least in part on preconfigured contention window parameters for different service priorities, different channel types, or a number of channels.

In some examples of the method, apparatuses, or non-transitory computer-readable medium described above, the contention window size is signaled in an uplink grant to a user equipment (UE). Additionally or alternatively, some examples may include performing the first LBT procedure to gain channel access to the first channel for downlink transmissions from a base station to one or more user equipment (UE).

Some examples of the method, apparatuses, or non-transitory computer-readable medium described above may further include performing the first LBT procedure to gain channel access to the first channel for uplink transmissions from a user equipment (UE) to a recipient base station. Additionally or alternatively, in some examples the performing the first LBT procedure may include performing a same LBT procedure for the first channel and the second channel.

In some examples of the method, apparatuses, or non-transitory computer-readable medium described above, performing the first LBT procedure may include determining that the recipient base station has reserved the first channel and that at least the second channel is unreserved, and performing the second LBT procedure for the second channel. Additionally or alternatively, in some examples a type of LBT procedure to perform for each channel is signaled in an uplink grant to the UE.

In some examples of the method, apparatuses, or non-transitory computer-readable medium described above, a type of LBT procedure to perform for each channel is determined based on a configuration of one or more base stations other than the recipient base station. Additionally or alternatively, in some examples an LBT procedure is not performed for each reserved channel.

In some examples of the method, apparatuses, or non-transitory computer-readable medium described above, performing the first LBT procedure comprises determining that the recipient base station has reserved the first channel and the second channel, and performing the second LBT procedure for the second channel. Additionally or alternatively, in some examples the contention window size for an LBT procedure is set to a minimum contention window size.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

Aspects of the disclosure are described in reference to the following figures.

DETAILED DESCRIPTION

Figure 1:
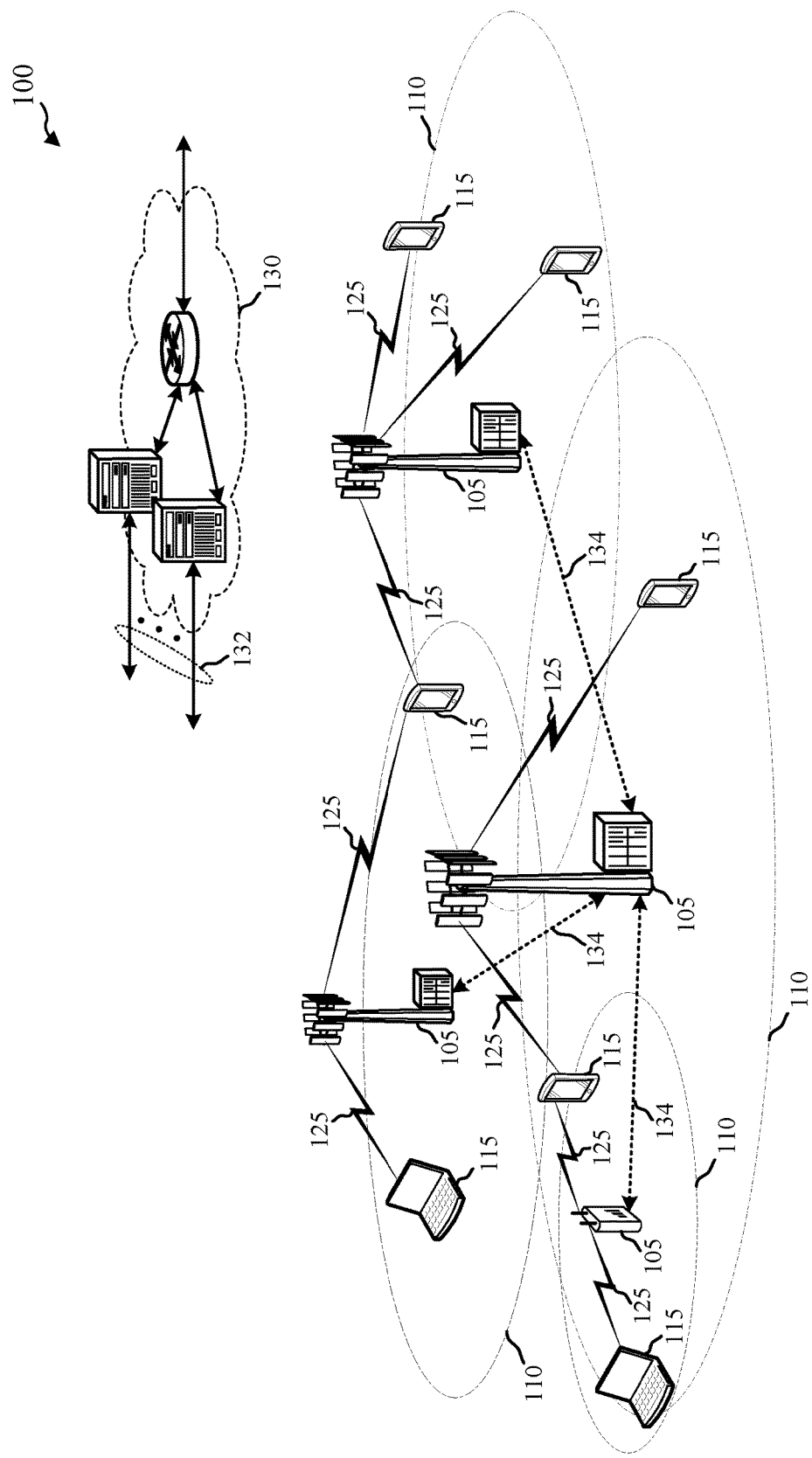
FIG. 1 illustrates an example of a wireless communication system in accordance with various aspects of the disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to some users (e.g., a licensed radio frequency spectrum band usable for LTE/LTE-A communications). The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

In some wireless systems, devices may perform a LBT procedure before sending data in order to prevent collisions. For example, a device may use a clear channel assessment (CCA). If the device senses that the channel is free, it may wait for a backoff period before attempting to transmit. The backoff period may reduce the chance of collisions if multiple devices are attempting to transmit at the same time. In some cases, the backoff period may be randomly chosen up to a predefined maximum value. For example, if a device performs a successful CCA, the device may immediately transmit data using the channel of the shared radio frequency spectrum band. In some deployments, a maximum channel occupancy time may be defined as $13/32*q$ ms, where q is a value between 4 and 32 inclusive, and thus q is used to determine the maximum contention window size. Following a transmission, the device, if additional data is present to be transmitted, may perform an extended CCA (eCCA). Additionally, if a CCA fails, the device may perform an eCCA. Such an eCCA procedure may include the device generating a random value N, uniform between 1 and q, storing N in a counter, decrementing the counter every time a CCA slot is clear, and performing a CCA when the counter reaches zero.

The value used for q may be determined, in some examples, semi-statically based a maximum possible channel occupation time when a device controls the channel. In some examples, a channel occupation time can be tailored to a time division duplexing (TDD) uplink-downlink (UL-DL) configuration. In some examples, a service priority specific q may be provided for channels, in which the q value can be different for service with different priorities. In deployments implementing such service specific values of q, a node (e.g., a base station or a UE) that has relatively high priority data (e.g., data having relatively strict quality of service parameters) may access the medium more quickly than a node having relatively low priority data. Additionally, values of q may also be dependent on a type of channel used for data transmission. For example, a physical uplink control channel (PUCCH) and physical uplink shared channel (PUSCH) may have different priority. In other examples, values of q may depend on the information to be delivered, such as channel quality information (CQI) transmitted using a PUSCH may have a different priority than PUSCH transmissions without CQI.

In deployments that may provide different values of q, multi-channel communications may also be used, in which different channels within a shared radio frequency spectrum band may be concurrently transmitted. For example, a number of channels may be present in a 5 GHz shared radio frequency spectrum band, and a separate number of channels may be present in a 2.4 GHz shared radio frequency spectrum band. In some cases, if a first channel of a shared radio frequency spectrum band is provided with a lower q value, and thus a shorter contention window, than a second channel of the same shared radio frequency spectrum band, a CCA for the second channel is much more likely to fail, and thus the second channel may be unused for that time period. In order to provide more efficient use of wireless resources, techniques described in some examples herein provide for applying a uniform contention window across multiple channels in a shared radio frequency spectrum band. In some examples, such uniform contention windows may be achieved by applying a contention window of the highest priority channel to all channels, or by applying a contention window that is a function of how many channels are involved and a priority of the channels.

In some examples, a UE seeking channel access may perform LBT procedures in a similar manner when operating in a multi-channel environment In some deployments, a UE may be scheduled for transmissions by a base station, and such a UE may perform a "one shot" CCA (in which q is set to a value of one) or may simply start transmissions. In some instances, multiple different carriers may share a radio frequency spectrum band, and may provide the capability of a recipient base station to reserve a channel for uplink transmissions from a UE. In cases where a UE is scheduled for transmissions, but the base station has not reserved the channel, the UE may not be able to simply transmit or perform a one shot CCA, but instead may need to perform an eCCA. In cases where the base station has reserved the channel, the UE may perform one shot CCA before transmission, or simply start transmitting, in some examples. Thus, depending upon the operating environment, different channels of a shared radio frequency spectrum band may have different medium access procedures. Such different access procedures may result in, similarly as discussed above, transmissions on a first channel of a shared radio frequency spectrum band causing failure of a CCA on a second channel of the shared radio frequency spectrum band. In order to provide more efficient use of wireless resources, techniques described in some examples herein provide for applying a same LBT procedure across multiple channels in a shared radio frequency spectrum band. The LBT procedure (e.g., one shot CCA, eCCA, etc.) may be determined based at least in part on whether a UE is scheduled for transmissions using one or more channels and whether one or more of the channels are reserved by the recipient base station.

Aspects of the disclosure are initially described in the context of a wireless communication system. Specific examples are then described for a clear channel assessment process. These and other aspects of the disclosure are further illustrated by and described with reference to apparatus diagrams, system diagrams, and flowcharts that relate to channel access techniques in a multi-channel environment.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the disclosure. Wireless communication system 100 may support techniques for managing medium access to multi-channels of a shared radio frequency spectrum band. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. The downlink transmissions may include, for example, a physical downlink shared channel (PDSCH), a physical downlink control channel (PDCCH; e.g., for transmission over a dedicated radio frequency spectrum band), an enhanced PDCCH (EPDCCH; e.g., for transmission over a shared radio frequency spectrum band), or a physical frame format indicator channel (PFFICH). In the case of TDD operation of the communication links 125, signaling on a PFFICH may indicate a TDD structure of a frame of communications over a communication link 125. The uplink transmissions may include, for example, a physical uplink shared channel (PUSCH) or a physical uplink control channel (PUCCH). The uplink transmissions may also include feedback (e.g., HARQ feedback) for the downlink transmissions.

In some examples, the communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

In some examples, the wireless communication system 100 may support operation over a dedicated radio frequency spectrum band (e.g., a radio frequency spectrum band for which transmitting apparatuses may not contend for access because the radio frequency spectrum band is licensed to users for specific uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

In some examples, as mentioned above, the wireless communication system 100 may utilize multiple carriers within a shared radio frequency spectrum band. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. In each communication direction, one CC may be configured as a primary cell (PCell), and the other CCs may be configured as secondary cells (SCells). Carrier aggregation may be used with both FDD and TDD component carriers. In some examples, channel access techniques for different carriers may provide that a UE 115 or base station 105 may use a same channel access procedure across multiple different carriers, may use a uniform contention window for channel access procedures, or combinations thereof.

Figure 2:
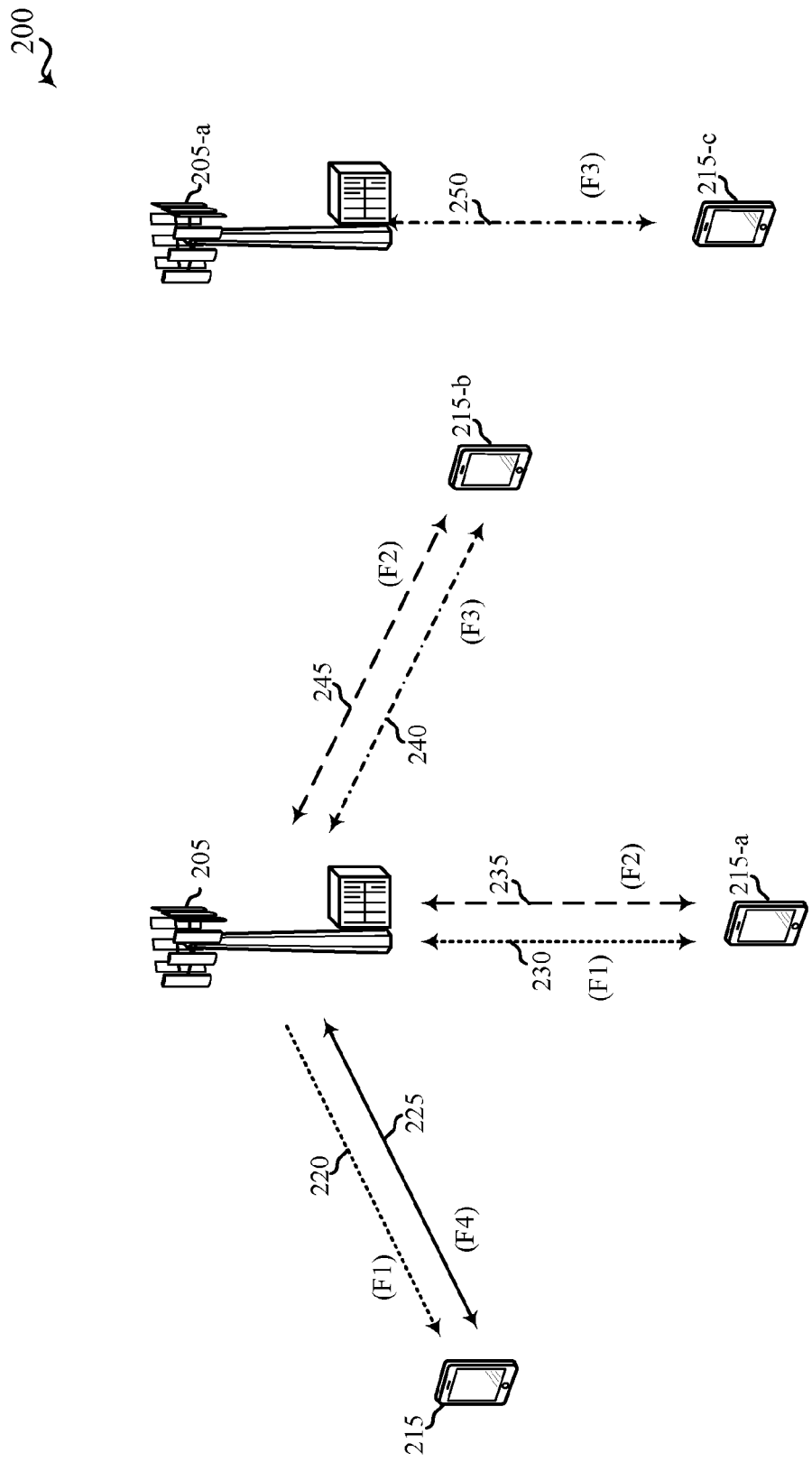
FIG. 2 shows a wireless communication system in accordance with aspects of the present disclosure.

FIG. 2 shows a wireless communication system 200 in accordance with aspects of the present disclosure. Wireless communication system 200 may be one in which LTE/LTE-A may be deployed under different scenarios using a shared radio frequency spectrum band. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. More-
over, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode (e.g., a licensed assisted access (LAA) mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO) or a carrier) that uses a dedicated radio frequency spectrum band and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink (e.g., the licensed assisted access mode) described above, this scenario may occur with any service provider (e.g., MNO or carrier) that uses a dedicated radio frequency spectrum band and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider, or carrier, that may benefit from the capacity offload offered by using LTE/LTE-A in a shared radio frequency spectrum band is a traditional MNO having access rights to an LTE/LTE-A dedicated radio frequency spectrum band. For these carriers, an operational example may include a bootstrapped mode (e.g., supplemental downlink (e.g., licensed assisted access), carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of a periodic radio frame structure (e.g., an LTE/LTE-A radio frame structure). The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame. In some examples, the channel of the shared radio frequency spectrum band may be reserved by transmitting a channel usage beacon signal (CUBS) over the shared radio frequency spectrum band.

Figure 3:
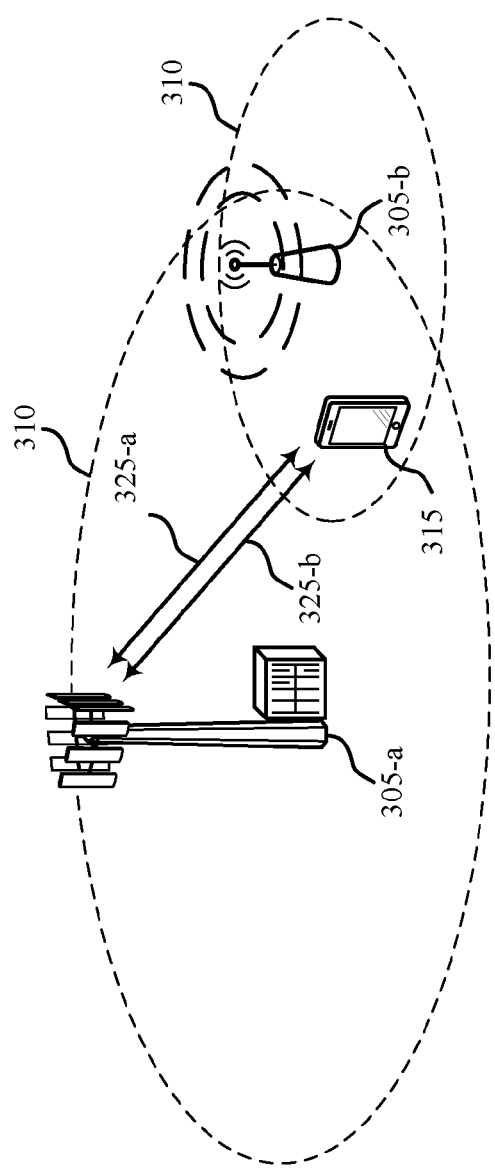
FIG. 3 illustrates an example of a wireless communication subsystem in accordance with aspects of the present disclosure.

FIG. 3 illustrates an example of a wireless communication subsystem 300 in accordance with aspects of the present disclosure. Wireless communication subsystem 300 may support techniques for managing medium access to multi-channels of a shared radio frequency spectrum band. Wireless communication subsystem 300 may include a UE 315, a first base station 305-a, and a second base station 305-b, which may be examples of a UE 115, UE 215, base station 105, or base station 205 described above with reference to FIG. 1 or 2, and may be communicating using one radio access technology (RAT) system in shared or unlicensed radio frequency spectrum band. Each of first base station 305-a and second base station 305-b have a corresponding coverage area 310, which may be examples of geographic coverage area 110 of FIG. 1. Wireless communication subsystem 300 may also include one or more other wireless devices (not shown), which may be using a different RAT in the same spectrum, such as a station or access point in a wireless local area network (WLAN). Base station 305-a may be operated by a first carrier, and may communicate with UE 315 using a first component carrier 325-a and a second component carrier 325-b. Base station 305-b may be operated by a second carrier using the same shared radio frequency spectrum band.

According to some examples, base station 305-a may perform an LBT procedure to access a first channel for the first component carrier 325-a, and may perform an LBT procedure to access a second channel for the second component carrier 325-b. Likewise, UE 315 may perform an LBT procedure to access a first channel for the first carrier, and may perform an LBT procedure to access a second channel for the second carrier. In some examples, the base station 305-a, as well as the UE 315, may use a same contention window size (e.g., a same q value) for each of the first and second channels. In the event that UE 315 or base station 305-a needs to update its contention window value based on service priority or channel type on one channel, the same contention window may be applied to all other channels. Thus, in some examples, the base station 305-a or UE 315 may attempt to access the shared radio frequency spectrum band and send high priority data on each channel with using a contention window that is derived using a same q value. Similarly, in some examples, if UE 315 has data to be transmitted using a PUCCH on first component carrier 325-a and data to be transmitted using a PUSCH on the second component carrier 325-b, the UE may determine a contention window based on the PUCCH channel type for application to both the first component carrier 325-a and the second component carrier 325-b.

In some examples, first base station 305-a may determine a contention window value based at least in part on a service priority and the total number of channels. For example, if data to be transmitted from the base station 305-a on both the first component carrier 325-*a* and the second component carrier 325-*b* has a same priority, the base station 305-*a* may use a different contention window size on the first component carrier 325-*a* and the second component carrier 325-*b* than would be used if the first base station 305-*a* were only transmitting on a single carrier. Likewise, if data to be transmitted from the UE 315 on both the first component carrier 325-*a* and the second component carrier 325-*b* has a same priority, the UE 315 may use a different contention window size on both the first component carrier 325-*a* and the second component carrier 325-*b* than would be used if the UE 315 were only transmitting on a single carrier. In some examples, the first base station 305-*a* may signal a contention window value to UE 315 in an uplink grant. In some examples, the contention window value may be semi-statically configured and signaled to the UE 315.

The UE 315, in some examples, may perform a same medium access procedure on all scheduled carriers. For example, if the UE 315 has scheduled grants on both the first component carrier 325-*a* and second component carrier 325-*b*, the UE 315 may perform a one shot CCA, or no CCA, before transmission on the first component carrier 325-*a* and second component carrier 325-*b*. In some examples, both first base station 305-*a* and second base station 305-*b* may schedule grants for UE 315, which may be referred to as cross-carrier scheduled grants. In some examples, in case of cross-carrier scheduled grants and the recipient base station 305 has not reserved the medium on any component carrier (e.g., the first component carrier 325-*a* and second component carrier 325-*b*), the UE 315 may perform eCCA before transmission on all component carriers. In other examples, in case of cross-carrier scheduled grants and the recipient base station 305 has reserved the medium on all component carriers, the UE 315 may just perform a one shot CCA (or no CCA) before transmission on all carriers. In still other examples, in case the recipient base station 305 has reserved the medium on one carrier (e.g., first component carrier 325-*a*) but not on other carriers (e.g., second component carrier 325-*b*), then the UE 315 may perform eCCA on all component carriers. In other examples, in case the recipient base station 305 has reserved the medium on less than all available carriers, then the UE 315 may be indicated about the type of eCCA procedure to use in an uplink grant, or through the configuration, with the CCA type used on all component carriers.

Figure 4:
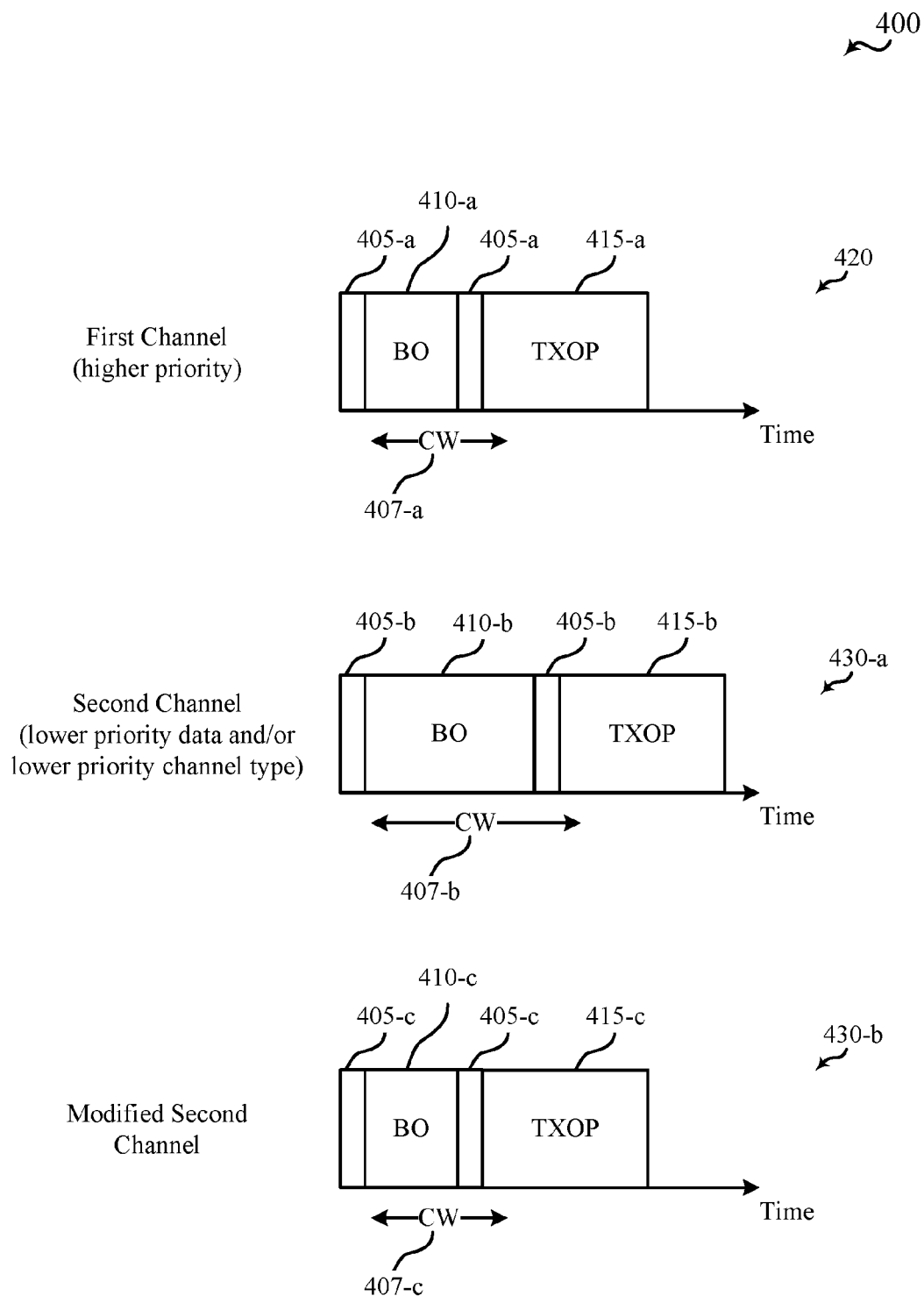
FIG. 4 illustrates an example of contention windows for different channels of a shared radio frequency spectrum band in accordance with aspects of the present disclosure.

FIG. 4 illustrates an example 400 of contention windows for different channels of a shared radio frequency spectrum band in accordance with aspects of the present disclosure. Contention window size and type of LBT procedure that may be utilized by a UE (e.g., UE 115, 215, 215-*a*, 215-*b*, 215-*c*, 315 of FIGS. 1 through 3) and base station (e.g., base station 105, 205, 205-*a*, 305-*a*, 305-*b* of FIGS. 1 through 3) may be determined as discussed above with respect to FIGS. 1 through 3. In some cases, as discussed above, a base station or a UE may monitor the medium or channel for a period of time before sending data in order to prevent collisions. For example, a first channel 420 may be monitored, which may have a higher priority than a second channel 430, such as through having higher priority data or a higher priority channel type. Contention window 407-*a* may be determined based on the priority of the first channel 420, in a manner similarly as discussed above, for example. If base station senses that the channel is free, it may wait for a backoff period 410 before attempting to transmit. In some cases, the backoff period 410 may be randomly chosen up to a predefined maximum value of contention window 407-*a*. In some cases, collisions may still occur. In such cases, the length of the CW may be increased, which may give more opportunities for multiple devices to successfully transmit.

Time period 405-*a* may represent a base station performing a carrier sense. When backoff period 410-*a* expires, base station may perform a carrier sense at time period 405-*b*. If the carrier is available, it may then transmit. Transmission opportunity 415-*a* may represent this period available for transmission. As mentioned above, a second channel 430-*a* may be scheduled to transmit lower priority data, or may be a lower priority channel type, than the first channel 420. As discussed above, if contention window 407-*b* and associated time period 405-*b*, backoff period 410-*b*, and transmission opportunity 415-*b*, were to be used for the second channel 430-*a*, transmissions starting on the first channel 420 may result in a failed CCA for the second channel. Thus, to enhance network efficiency and allow for a higher likelihood of transmissions using both first channel 420 and second channel 430-*a*, various examples provide for a modified second channel 430-*b*, in which the contention window 407-*a*, and associated time period 405-*c*, backoff period 410-*c*, and transmission opportunity 415-*c*, are set to be the same values as for the first channel 420. Furthermore, in the event that the channels 420, 430 may be uplink channels, a UE transmitting the channels 420, 430 may perform a same type of LBT procedure (e.g., a one shot CCA, eCCA, etc.) for each channel 420, 430.

Figure 5:
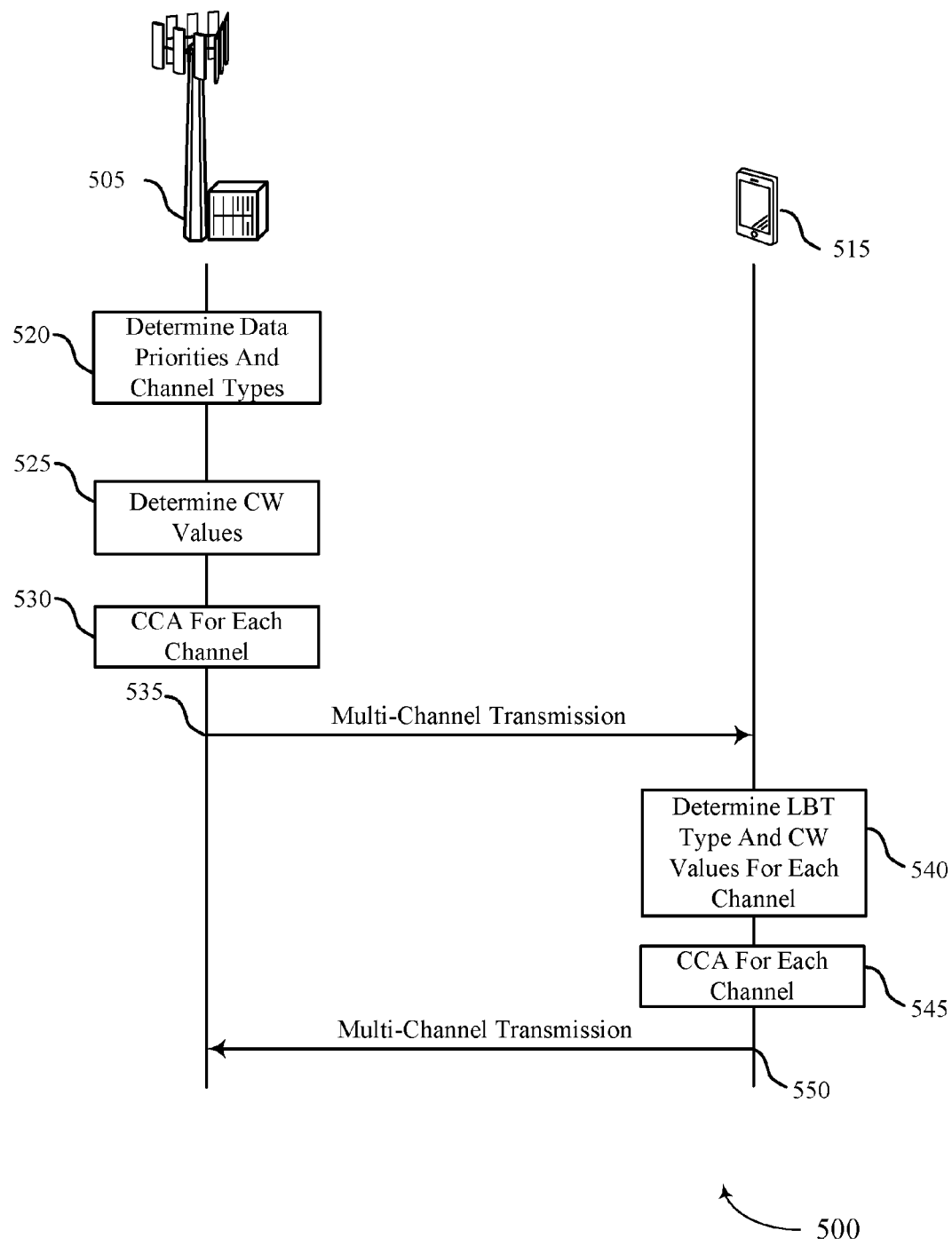
FIG. 5 illustrates an example of a process flow that supports techniques for managing medium access to multi-channels of a shared radio frequency spectrum band in accordance with aspects of the present disclosure.

FIG. 5 illustrates an example of a process flow 500 for techniques for managing medium access to multi-channels of a shared radio frequency spectrum band in accordance with aspects of the present disclosure. Process flow 500 may include a UE 515 and base station 505, which may be examples of a UE (e.g., UE 115, 215, 215-*a*, 215-*b*, 215-*c*, 315 of FIGS. 1 through 3) and base station (e.g., base station 105, 205, 205-*a*, 305-*a*, 305-*b* of FIGS. 1-3).

At block 520, the base station 505 may determine data priorities and channel types for data to be transmitted using multiple channels. At block 525, the base station 505 may determine contention window values for each of the multiple channels, in a manner similarly as discussed above with respect to FIGS. 1 through 4. For example, base station 505 may determine a contention window size associated with a first listen-before-talk (LBT) procedure to access a first channel of a shared radio frequency spectrum band, which may be applied to a second channel of the shared radio frequency spectrum band. At block 530, the base station 505 may perform a CCA for each channel, using the determined CW values. In some examples determining the contention window size may include identifying or determining whether one or more of a service priority or a channel type for data to be transmitted using the first channel. In some other examples determining the contention window size may include identifying or determining whether one or more of a service priority or a channel type for data to be transmitted using multiple channels. Multi-channel transmission 535 may then be transmitted to UE 515.

At block 540, the UE 515 may determine a LBT type and contention window value for each channel for uplink transmissions, in a manner similarly as discussed above with respect to FIGS. 1 through 4. At block 545, the UE 515 may perform a CCA for each channel. For example, the UE 515 may perform a same CCA procedure for each channel. In some examples a type of CCA procedure to perform for each channel is signaled in multi-channel transmission 535, which may include an uplink grant to the UE 515. In some examples a type of CCA procedure to perform for each channel is determined based at least in part on a configuration of one or more base stations other than the base station 505, and the type of CCA procedure may be applied to each channel. In some examples the CCA procedure may not be performed for each reserved channel. In some examples, each channel may be reserved for uplink multi-channel transmission 550 from the UE 515, and the contention window size for the CCA procedure may be set to a minimum contention window size.

Figure 6:
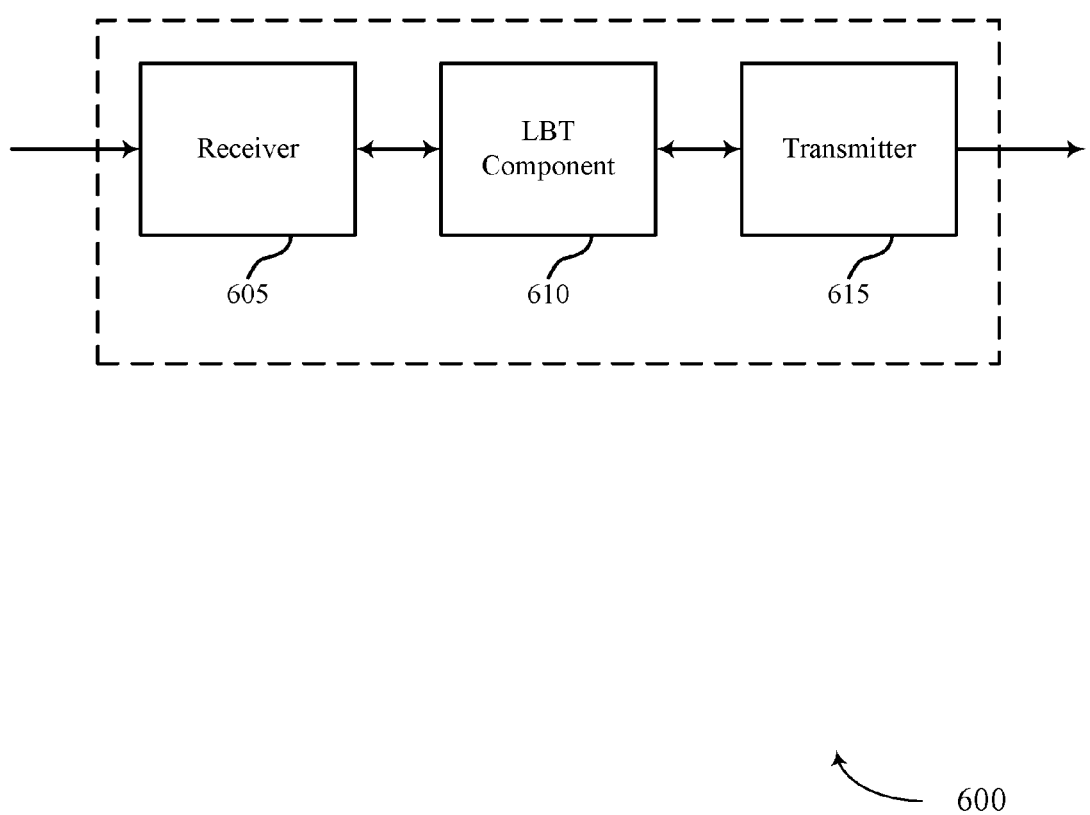
FIGS. 6 through 8 show block diagrams of a wireless device that supports techniques for managing medium access to multi-channels of a shared radio frequency spectrum band in accordance with aspects of the present disclosure.

FIG. 6 shows a block diagram of a wireless device 600 that supports techniques for managing medium access to multi-channels of a shared radio frequency spectrum band in accordance with aspects of the present disclosure. Wireless device 600 may be an example of aspects of a base station 105, 205, 205-a, 305-a, 305-b, or 505, or a UE 115, 215, 215-a, 215-b, 215-c, 315, or 515 described with reference to FIGS. 1 through 5. Wireless device 600 may include a receiver 605, a LBT component 610, or a transmitter 615. Wireless device 600 may also include a processor. Each of these components may be in communication with each other.

The receiver 605 may receive information such as packets, user data, or control information associated with various information channels (e.g., control channels, data channels, and information related to techniques for managing medium access to multi-channels of a shared radio frequency spectrum band, etc.). Information may be passed on to the LBT component 610, and to other components of wireless device 600.

The LBT component 610 may determine a contention window size associated with a first listen-before-talk (LBT) procedure to access a first channel of a shared radio frequency spectrum band, and apply the contention window size for a second LBT procedure to access a second channel of the shared radio frequency spectrum band. The transmitter 615 may transmit signals received from other components of wireless device 600. In some examples, the transmitter 615 may be collocated with the receiver 605 in a transceiver module. The transmitter 615 may include a single antenna, or it may include a plurality of antennas.

Figure 7:
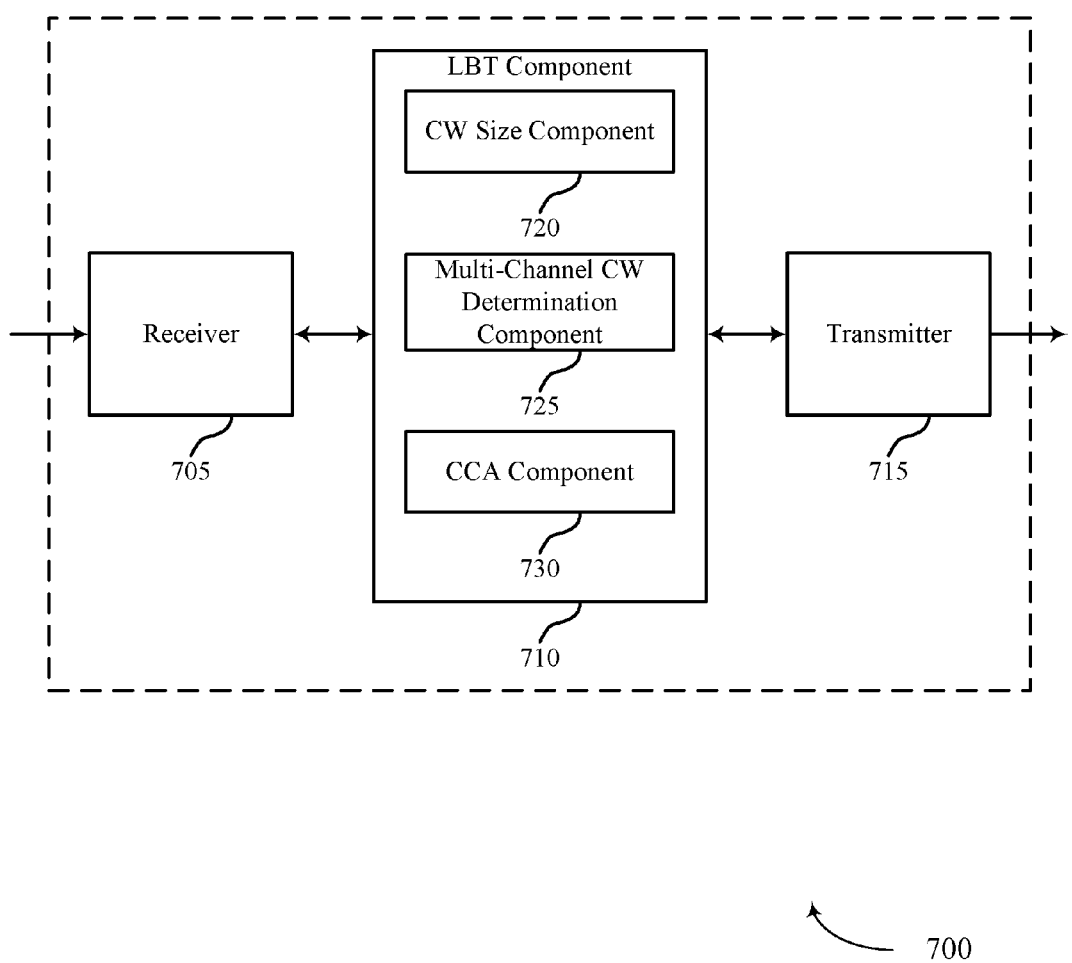

FIG. 7 shows a block diagrams of a wireless device 700 that supports techniques for managing medium access to multi-channels of a shared radio frequency spectrum band in accordance with aspects of the present disclosure. Wireless device 700 may be an example of aspects of a wireless device 600, a base station 105, 205, 205-a, 305-a, 305-b, or 505, or a UE 115, 215, 215-a, 215-b, 215-c, 315, or 515, described with reference to FIGS. 1 through 6. Wireless device 700 may include a receiver 705, a LBT component 710, or a transmitter 715. Wireless device 700 may also include a processor. Each of these components may be in communication with each other. The LBT component 710 may also include a CW size component 720, a multi-channel CW determination component 725, and a CCA component 730.

The receiver 705 may receive information which may be passed on to LBT component 710, and to other components of wireless device 700. The LBT component 710 may perform the operations described with reference to FIG. 6. The transmitter 715 may transmit signals received from other components of wireless device 700.

The CW size component 720 may determine a contention window size associated with a first listen-before-talk (LBT) procedure to access a first channel of a shared radio frequency spectrum band as described with reference to FIGS. 2 through 5. The CW size component 720 may also determine the contention window size based at least in part on the identified one or more service priority or channel type. In some examples, the contention window size may be determined to be shorter for data having higher service priority than for data having lower service priority. In some examples, the contention window size may be determined to be shorter for data to be transmitted using a control channel than for data transmitted using a shared channel. In some examples, the contention window size may be determined to be shorter for shared channel data including channel condition information than for shared channel data without channel condition information. In some examples, the contention window size may be determined based at least in part on a number of available channels in the shared radio frequency spectrum band, for which an LBT procedure may be performed. In some examples, the contention window size may be determined based at least in part on preconfigured contention window parameters for different service priorities, different channel types, or a number of channels. In some examples, the contention window size for the LBT procedure may be set to a minimum contention window size.

The multi-channel CW determination component 725 may apply the contention window size for a second LBT procedure to access a second channel of the shared radio frequency spectrum band as described with reference to FIGS. 2 through 5. The CCA component 730 may perform the LBT procedure to gain channel access to the first channel for downlink transmissions from a base station to one or more user equipment (UE) as described with reference to FIGS. 2 through 5. The CCA component 730 may also perform the LBT procedure to gain channel access to the first channel for uplink transmissions from a user equipment (UE) to a recipient base station. In some examples, the performing the LBT procedure comprises performing a same LBT procedure for the first channel and the second channel. The CCA component 730 may also perform the LBT procedure for each channel. In some examples, a type of LBT procedure to perform for each channel may be determined based at least in part on a configuration of one or more base stations other than the recipient base station. In some examples, the LBT procedure may be not performed for each reserved channel. The CCA component 730 may also perform the LBT procedure for each channel.

Figure 8:
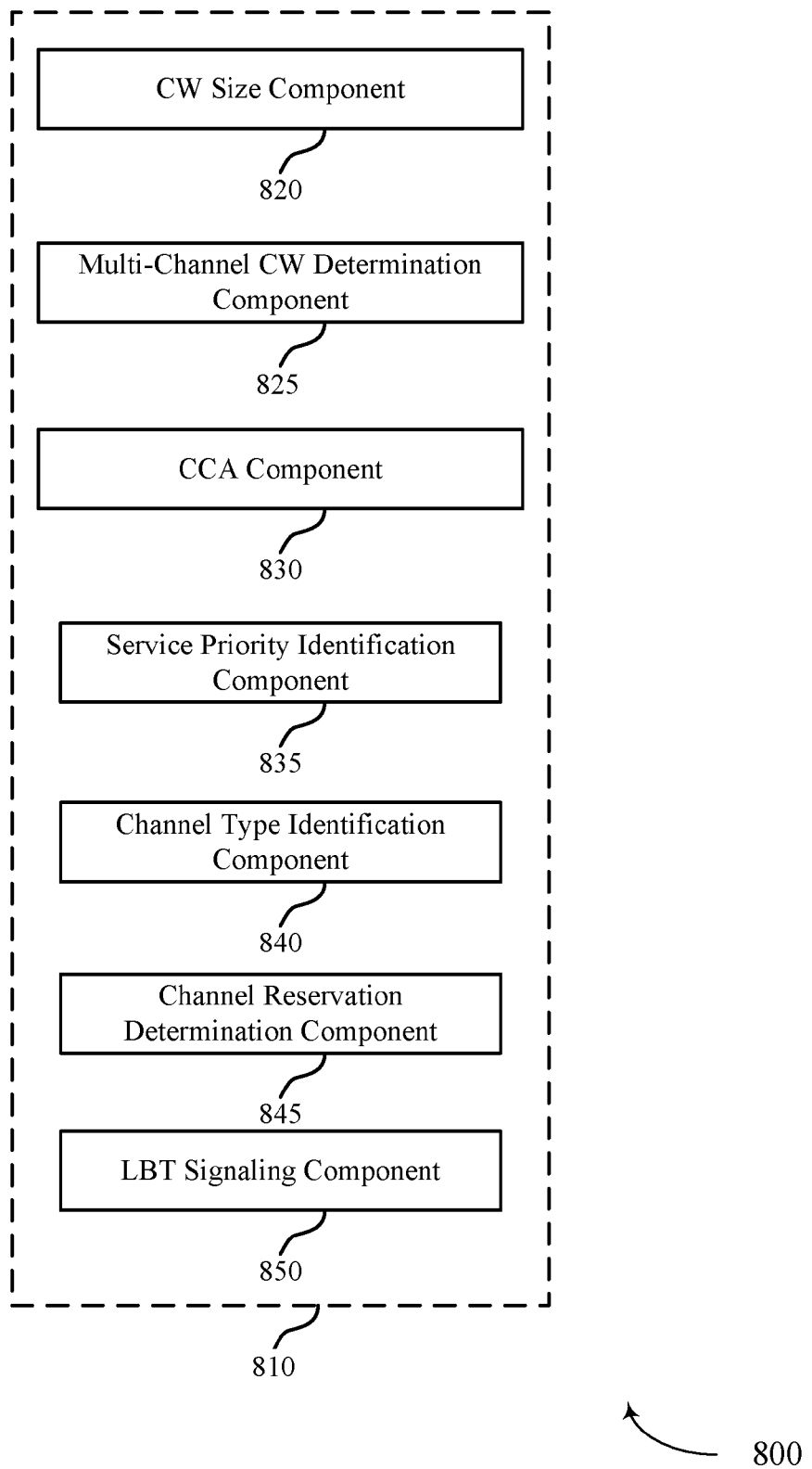

FIG. 8 shows a block diagram 800 of a wireless device that supports techniques for managing medium access to multi-channels of a shared radio frequency spectrum band in accordance with aspects of the present disclosure. The block diagram 800 includes a LBT component 810 which may be a component of a wireless device 600 or a wireless device 700 for techniques for managing medium access to multi-channels of a shared radio frequency spectrum band in accordance with aspects of the present disclosure. The LBT component 810 may be an example of aspects of a LBT component 610 or LBT component 710 described with reference to FIGS. 6 and 7. The LBT component 810 may include a CW size component 820 which may be an example of CW size component 720 of FIG. 7, a multi-channel CW determination component 825 which may be an example of multi-channel CW determination component 725 of FIG. 2, or a CCA component 830 which may be an example of CCA component 730 of FIG. 7. Each of these components may perform the functions described with reference to FIG. 7. The LBT component 810 may also include a service priority identification component 835, a channel type identification component 840, a channel reservation determination component 845, and a LBT signaling component 850.

The service priority identification component 835 may be configured to identify a service priority of a data to be transmitted using a channel, and the channel type identification component 840 may be configured to identify a channel type of the channel. As discussed above with reference to FIGS. 2 through 5, in some examples determining the contention window size may include identifying or determining whether one or more of a service priority or a channel type for data to be transmitted using the first channel. The service priority identification component 835 and the channel type identification component 840 may also be used to determine or more of the service priority or the channel type for data to be transmitted using the first channel is different from the service priority or the channel type for data to be transmitted using the second channel.

The service priority identification component 835 may be configured to determine whether that the second channel of the shared radio frequency spectrum band has a lower service priority than the first channel. The channel type identification component 840 may be configured to determine whether that the second channel of the shared radio frequency spectrum band has or lower priority channel type than the first channel. In some examples, the contention window size may be determined based at least in part on a combination of the service priority or channel type of each of the first channel and the second channel as described with reference to FIGS. 2 through 5.

The LBT signaling component 850 may be configured such that the contention window size may be signaled in an uplink grant to a user equipment (UE) as described with reference to FIGS. 2 through 5. In some examples, a type of LBT procedure to perform for each channel may be signaled in an uplink grant to the UE. In other examples, the LBT signaling component 850 may provide configuration information that includes semi-static signaling of a contention window size or LBT procedure to perform for uplink transmissions.

The channel reservation determination component 845 may be configured to determine whether the recipient base station has reserved the first channel, and that at least the second channel may be unreserved as described with reference to FIGS. 2 through 5. In some examples, a same type of LBT procedure may be used for both reserved and unreserved channels.

Figure 9:
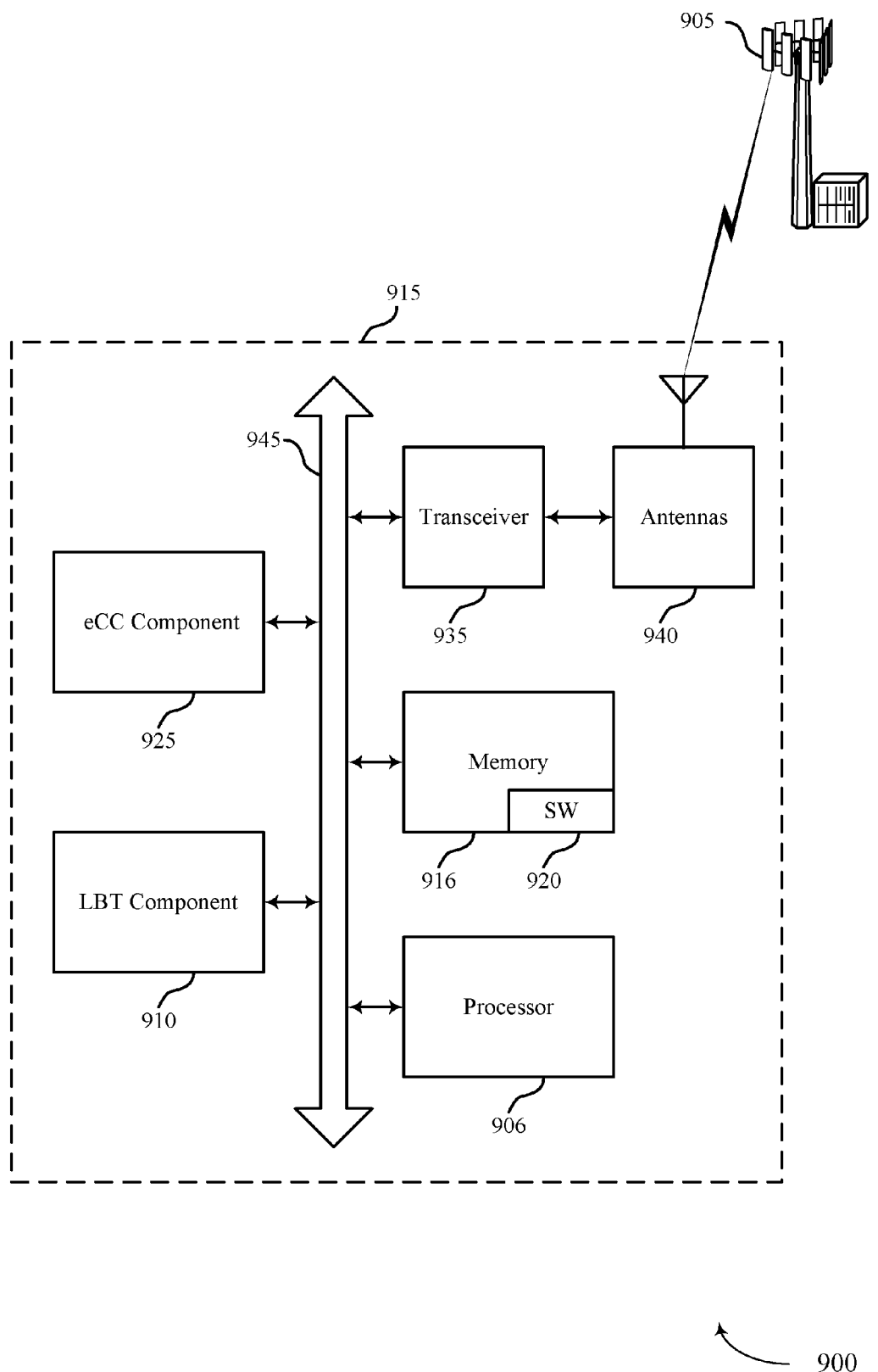
FIG. 9 illustrates a block diagram of a system including a UE that supports techniques for managing medium access to multi-channels of a shared radio frequency spectrum band in accordance with aspects of the present disclosure.

FIG. 9 illustrates a block diagram of a system 900 including a UE that supports techniques for managing medium access to multi-channels of a shared radio frequency spectrum band in accordance with aspects of the present disclosure. System 900 may include UE 915, which may be an example of a wireless device 600, a wireless device 700, or a UE 115, 215, 215-a, 215-b, 215-c, 315, or 515 described with reference to FIGS. 1 through 3, 5, or 6-8. UE 915 may include a LBT component 910, which may be an example of a LBT component 610 LBT component 710, or LBT component 810 described with reference to FIGS. 6 through 8. UE 915 may also include an eCC component 925. UE 915 may also include components for bi-directional voice and data communications including components for transmitting communications and components for receiving communications. For example, UE 915 may communicate bi-directionally with base station 905 or other UEs.

The eCC component 925 enable UE 915 to operate using eCCs as described with reference to FIG. 1 or 3 through 5. For example, UE 915 may operate in shared or unlicensed spectrum, using two or more CCs within a same shared radio frequency spectrum band.

UE 915 may also include a processor 906, and memory 916 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 905 or another UE. The transceiver 935 may include a modem to modulate the packets and provide the modulated packets to the antenna(s) 940 for transmission, and to demodulate packets received from the antenna(s) 940. While UE 915 may include a single antenna 940, UE 915 may also have multiple antennas 940 capable of concurrently transmitting or receiving multiple wireless transmissions.

The memory 916 may include random access memory (RAM) and read only memory (ROM). The memory 916 may store computer-readable, computer-executable software/firmware code 920 including instructions that, when executed, cause the processor 906 to perform various functions described herein (e.g., techniques for managing medium access to multi-channels of a shared radio frequency spectrum band, etc.). Alternatively, the software/firmware code 920 may not be directly executable by the processor 906 but cause a computer (e.g., when compiled and executed) to perform functions described herein. The processor 906 may include an intelligent hardware device, (e.g., a central processing unit (CPU), a microcontroller, an application specific integrated circuit (ASIC), etc.)

Figure 10:
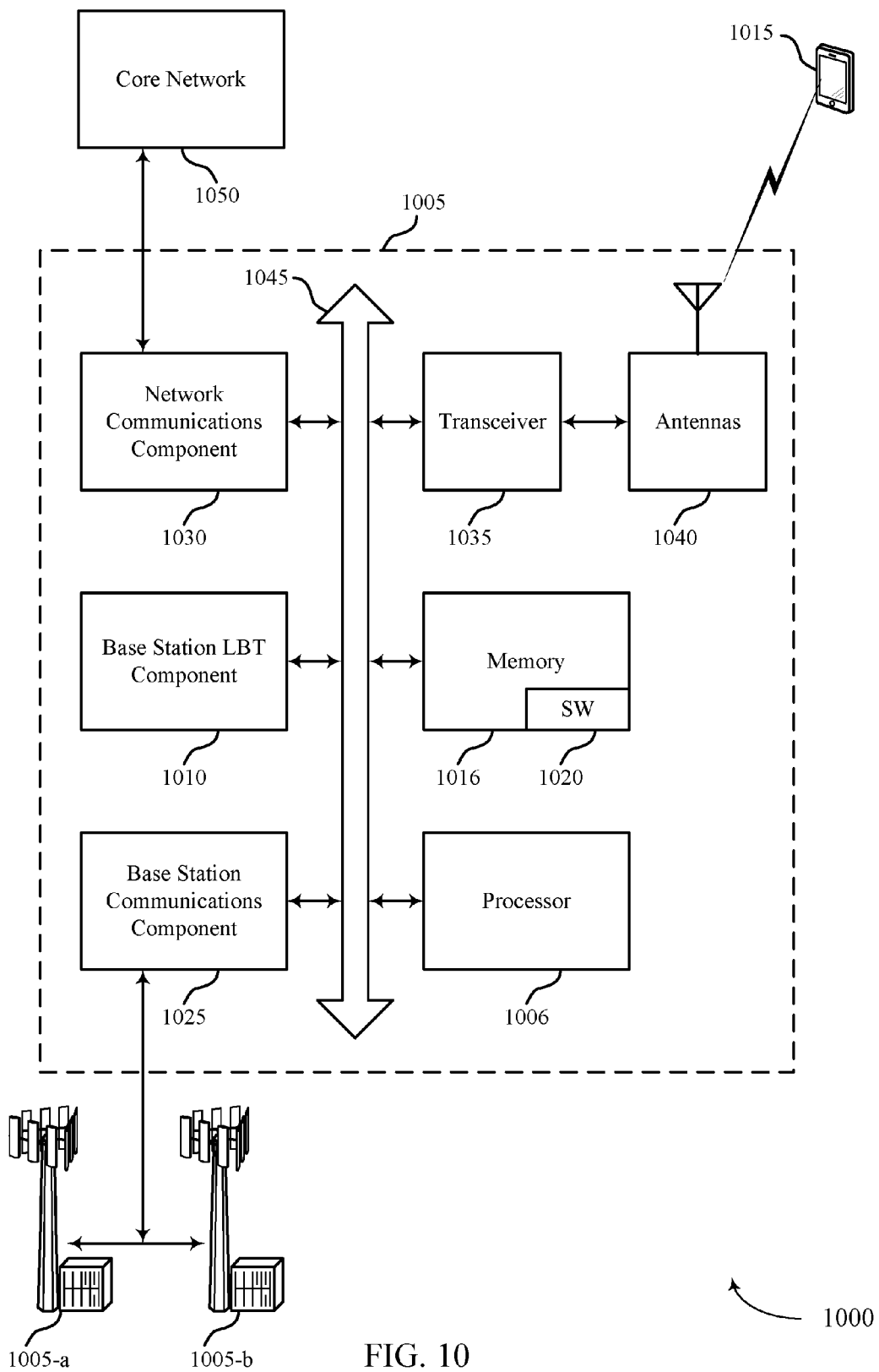
FIG. 10 illustrates a block diagram of a system including a base station that supports techniques for managing medium access to multi-channels of a shared radio frequency spectrum band in accordance with aspects of the present disclosure.

FIG. 10 illustrates a block diagram of a system 1000 including a base station that supports techniques for managing medium access to multi-channels of a shared radio frequency spectrum band in accordance with aspects of the present disclosure. System 1000 may include base station 1005, which may be an example of a wireless device 600, a wireless device 700, or a base station 105, 205, 205-a, 305-a, 305-b, or 505 described with reference to FIGS. 6 through 8 or 1 through 5, respectively. Base Station 1005 may include a base station LBT component 1010, which may be an example of a LBT component 610, a LBT component 710, or an LBT component 810 described with reference to FIGS. 6 through 8. Base Station 1005 may also include components for bi-directional voice and data communications including components for transmitting communications and components for receiving communications. For example, base station 1005 may communicate bi-directionally with UE 1015.

In some cases, base station 1005 may have one or more wired backhaul links. Base station 1005 may have a wired backhaul link (e.g., S1 interface, etc.) to the core network 130. Base station 1005 may also communicate with other base stations, such as base station 1005-a and base station 1005-b via inter-base station backhaul links (e.g., an X2 interface). Each of the base stations 1005 may communicate with UE 1015 using the same or different wireless communication technologies. In some cases, base station 1005 may communicate with other base stations such as base station 1005-a or base station 1005-b utilizing base station communication component 1025. In some examples, base station communication component 1025 may provide an X2 interface within a Long Term Evolution (LTE)/LTE wireless communication network technology to provide communication between some of the base stations 1005. In some examples, base station 1005 may communicate with other base stations through core network 130. In some cases, base station 1005 may communicate with the core network 130 through network communication component 1030.

The base station 1005 may include a processor 1006, memory 1016 (including software (SW) 1020), transceiver 1035, and antenna(s) 1040, which each may be in communication, directly or indirectly, with one another (e.g., over bus system 1045). The transceivers 1035 may be configured to communicate bi-directionally, via the antenna(s) 1040, with the UE 1015, which may be multi-mode devices. The transceiver 1035 (or other components of the base station 1005) may also be configured to communicate bi-directionally, via the antennas 1040, with one or more other base stations (not shown). The transceiver 1035 may include a modem configured to modulate the packets and provide the modulated packets to the antennas 1040 for transmission, and to demodulate packets received from the antennas 1040. The base station 1005 may include multiple transceivers 1035, each with one or more associated antennas 1040. The transceiver may be an example of a combined receiver 605 and transmitter 615 of FIG. 6 or a combined receiver 705 and transmitter 715 of FIG. 7.

The memory 1016 may include RAM and ROM. The memory 1016 may also store computer-readable, computer-executable software code 1020 containing instructions that are configured to, when executed, cause the processor 1006 to perform various functions described herein (e.g., techniques for managing medium access to multi-channels of a shared radio frequency spectrum band, call processing, database management, message routing, etc.). Alternatively, the software 1020 may not be directly executable by the processor 1006 but be configured to cause the computer, e.g., when compiled and executed, to perform functions described herein. The processor 1006 may include an intelligent hardware device, e.g., a CPU, a microcontroller, an ASIC, etc. The processor 1006 may include various special purpose processors such as encoders, queue processing modules, base band processors, radio head controllers, digital signal processor (DSPs), and the like.

The base station communication component 1025 may manage communications with other base station 1005-*a* and base station 1005-*b*. In some cases, a communications management component may include a controller or scheduler for controlling communications with UE 1015 in cooperation with other base station 1005-*a* or base station 1005-*b*. For example, the base station communication component 1025 may coordinate scheduling for transmissions to UEs 1015 for various interference mitigation techniques or coordinated multipoint (CoMP) techniques such as beamforming or joint transmission.

The components of wireless device 600, wireless device 700, LBT component 810, UE 915 or base station 1005 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 11:
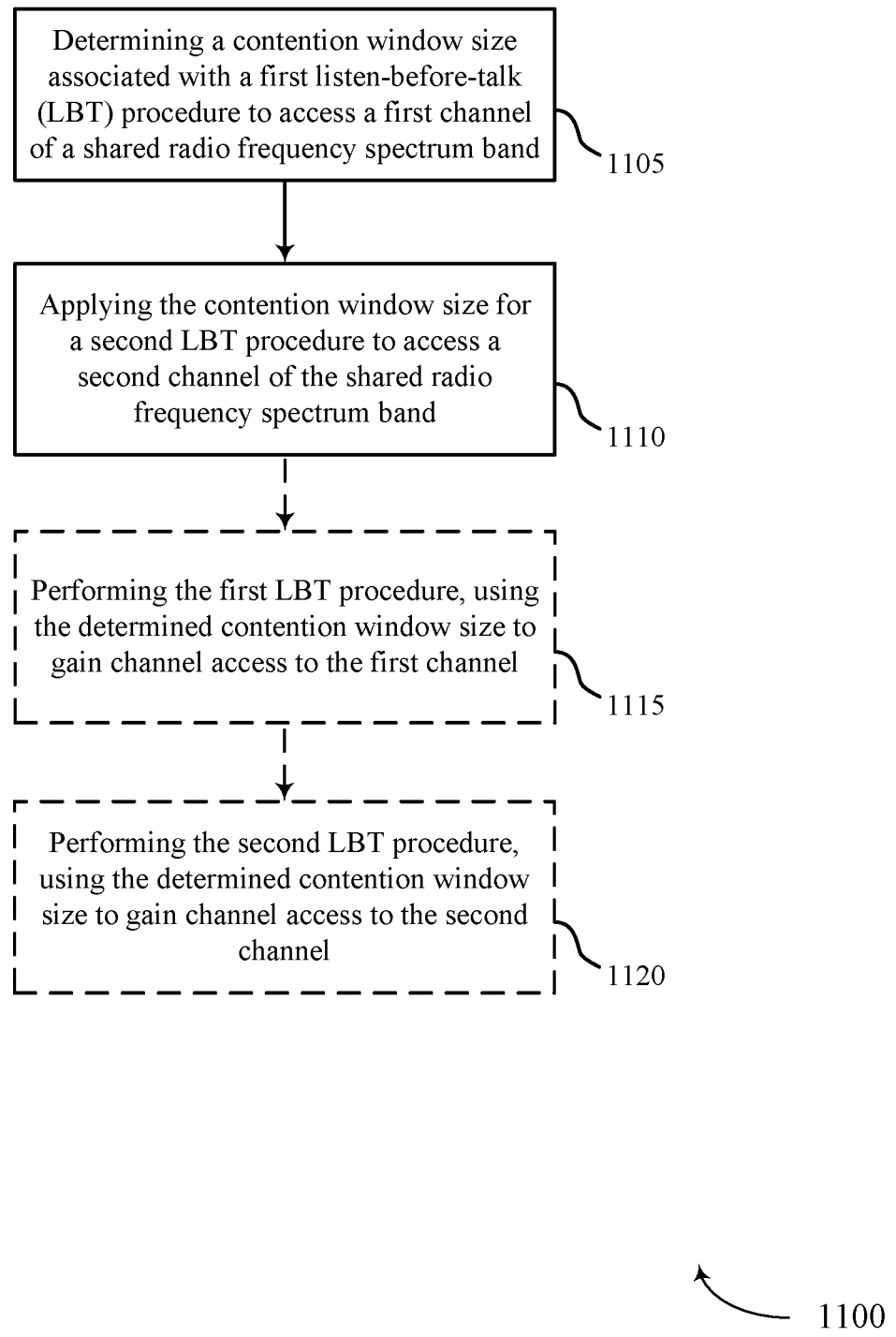
FIGS. 11 through 14 illustrate methods for techniques for managing medium access to multi-channels of a shared radio frequency spectrum band in accordance with aspects of the present disclosure.

FIG. 11 illustrates a method for techniques for managing medium access to multi-channels of a shared radio frequency spectrum band in accordance with aspects of the present disclosure. The operations of method 1100 may be implemented by a device such as a base station 105, 205, 205-*a*, 305-*a*, 305-*b*, 505, or 1005, a UE 115, 215, 215-*a*, 215-*b*, 215-*c*, 315, 515, or 915, a wireless device 600, a wireless device 700, or LBT component 810, as described with reference to FIGS. 1 through 10. For example, the operations of method 1100 may be performed by the LBT component 610, LBT component 710, LBT component 810, LBT component 910, or base station LBT component 1010 as described with reference to FIGS. 6 through 10. In some examples, a base station 105, 205, 205-*a*, 305-*a*, 305-*b*, 505, or 1005, a UE 115, 215, 215-*a*, 215-*b*, 215-*c*, 515, or 915, wireless device 600, wireless device 700, or LBT component 810 may execute a set of codes to control the functional elements of the respective device to perform the functions described below. Additionally or alternatively, aspects the functions described below may be performed using special-purpose hardware.

At block 1105, the method may include determining a contention window size associated with a first listen-before-talk (LBT) procedure to access a first channel of a shared radio frequency spectrum band as described with reference to FIGS. 2 through 5. In some examples, the operations of block 1105 may be performed by the CW size component 720 or 820 as described with reference to FIGS. 7 and 8.

At block 1110, the method may include applying the contention window size for a second LBT procedure to access a second channel of the shared radio frequency spectrum band as described with reference to FIGS. 2 through 5. In some examples, the operations of block 1110 may be performed by the multi-channel CW determination component 725 or 810 as described with reference to FIG. 7 through 8.

At block 1115, the method may optionally include performing the first LBT procedure, using the determined contention window size to gain channel access to the first channel, as described with reference to FIGS. 2 through 5. In some examples, the operations of block 1115 may be performed by the CCA component 730 or 830 as described with reference to FIGS. 7 and 8.

At block 1120, the method may optionally include performing the second LBT procedure, using the determined contention window size to gain channel access to the second channel, as described with reference to FIGS. 2 through 5. In some examples, the operations of block 1120 may be performed by the CCA component 730 or 830 as described with reference to FIGS. 7 and 8.

Figure 12:
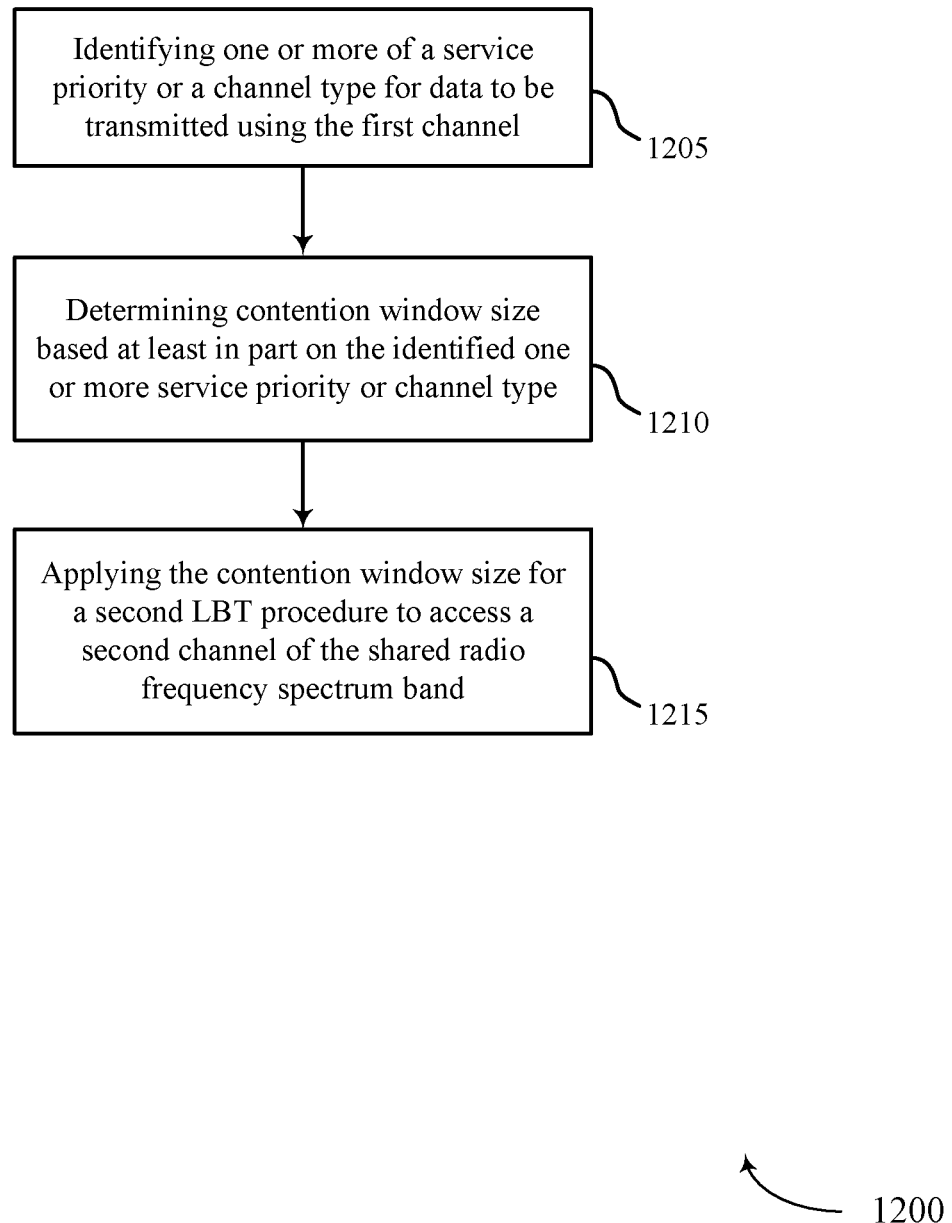

FIG. 12 illustrates a method 1200 for techniques for managing medium access to multi-channels of a shared radio frequency spectrum band in accordance with aspects of the present disclosure. The operations of method 1200 may be implemented by a device such as a base station 105, 205, 205-*a*, 305-*a*, 305-*b*, 505, or 1005, a UE 115, 215, 215-*a*, 215-*b*, 215-*c*, 515, or 915, a wireless device 600, wireless device 700, or LBT component 810, as described with reference to FIGS. 1 through 10. For example, the operations of method 1200 may be performed by the LBT component 610, LBT component 710, LBT component 810, LBT component 910, or base station LBT component 1010 as described with reference to FIGS. 6 through 10. In some examples, a base station 105, 205, 205-*a*, 305-*a*, 305-*b*, 505, or 1005, a UE 115, 215, 215-*a*, 215-*b*, 215-*c*, 315, 515, or 915, wireless device 600, wireless device 700, or LBT component 810 may execute a set of codes to control the functional elements of the respective device to perform the functions described below. Additionally or alternatively, aspects the functions described below may be performed using special-purpose hardware. The method 1200 may also incorporate aspects of method 1100 of FIG. 11.

At block 1205, the method may include determining whether one or more of a service priority or a channel type for data to be transmitted using the first channel, as described with reference to FIGS. 2 through 5. In some examples, the operations of block 1205 may be performed by the service priority identification component 835 by the channel type identification component 840, or combinations thereof. as described with reference to FIG. 8.

At block 1210, the method may include determining contention window size based at least in part on the identified one or more service priority or channel type, as described with reference to FIGS. 2 through 5. In some examples, the operations of block 1210 may be performed by the CW size component 720 or 820 as described with reference to FIGS. 7 and 8.

At block 1215, the method may include applying the contention window size for a second LBT procedure to access a second channel of the shared radio frequency spectrum band, as described with reference to FIGS. 2 through 5. In some examples, the operations of block 1215 may be performed by the multi-channel CW determination component 725 or 810 as described with reference to FIGS. 7 and 8.

Figure 13:
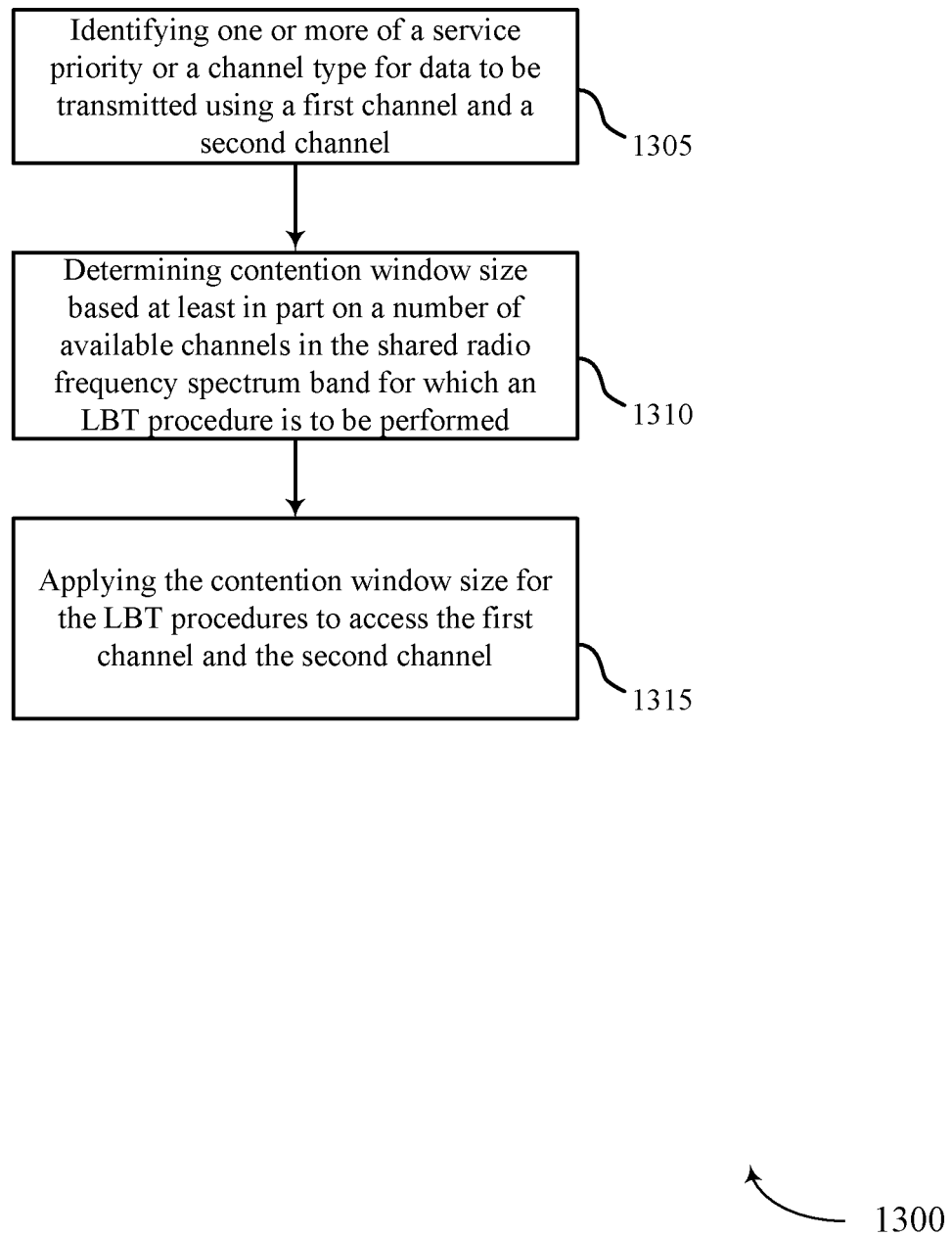

FIG. 13 illustrates a method 1300 for techniques for managing medium access to multi-channels of a shared radio frequency spectrum band in accordance with aspects of the present disclosure. The operations of method 1300 may be implemented by a device such as a base station 105, 205, 205-*a*, 305-*a*, 305-*b*, 505, or 1005, a UE 115, 215, 215-*a*, 215-*b*, 215-*c*, 315, 515, or 915, a wireless device 600, 700, or LBT component 810, as described with reference to FIGS. 1 through 10. For example, the operations of method 1300 may be performed by the LBT component 610, LBT component 710, LBT component 810, LBT component 910, or base station LBT component 1010 as described with reference to FIGS. 6 through 10. In some examples, a base station 105, 205, 205-*a*, 305-*a*, 305-*b*, 505, or 1005, a UE 115, 215, 215-*a*, 215-*b*, 215-*c*, 315, 515, or 915, wireless device 600, wireless device 700, or LBT component 810 may execute a set of codes to control the functional elements of the respective device to perform the functions described below. Additionally or alternatively, aspects the functions described below may be performed using special-purpose hardware. The method 1300 may also incorporate aspects of methods 1100, and 1200 of FIGS. 11 and 12.

At block 1305, the method may include determining whether one or more of a service priority or a channel type for data to be transmitted using a first channel and a second channel, as described with reference to FIGS. 2 through 5. In some examples, the operations of block 1305 may be performed by the service priority identification component 835 by the channel type identification component 840, or combinations thereof. as described with reference to FIG. 8.

At block 1310, the method may include determining contention window size based at least in part on a number of available channels in the shared radio frequency spectrum band for which an LBT procedure is to be performed, as described with reference to FIGS. 2 through 5. In some examples, the operations of block 1310 may be performed by the CW size component 720 or 820 as described with reference to FIGS. 7 and 8.

At block 1315, the method may include Applying the contention window size for the LBT procedures to access the first channel and the second channel, as described with reference to FIGS. 2 through 5. In some examples, the operations of block 1315 may be performed by the multi-channel CW determination component 725 or 810 as described with reference to FIGS. 7 and 8.

Figure 14:
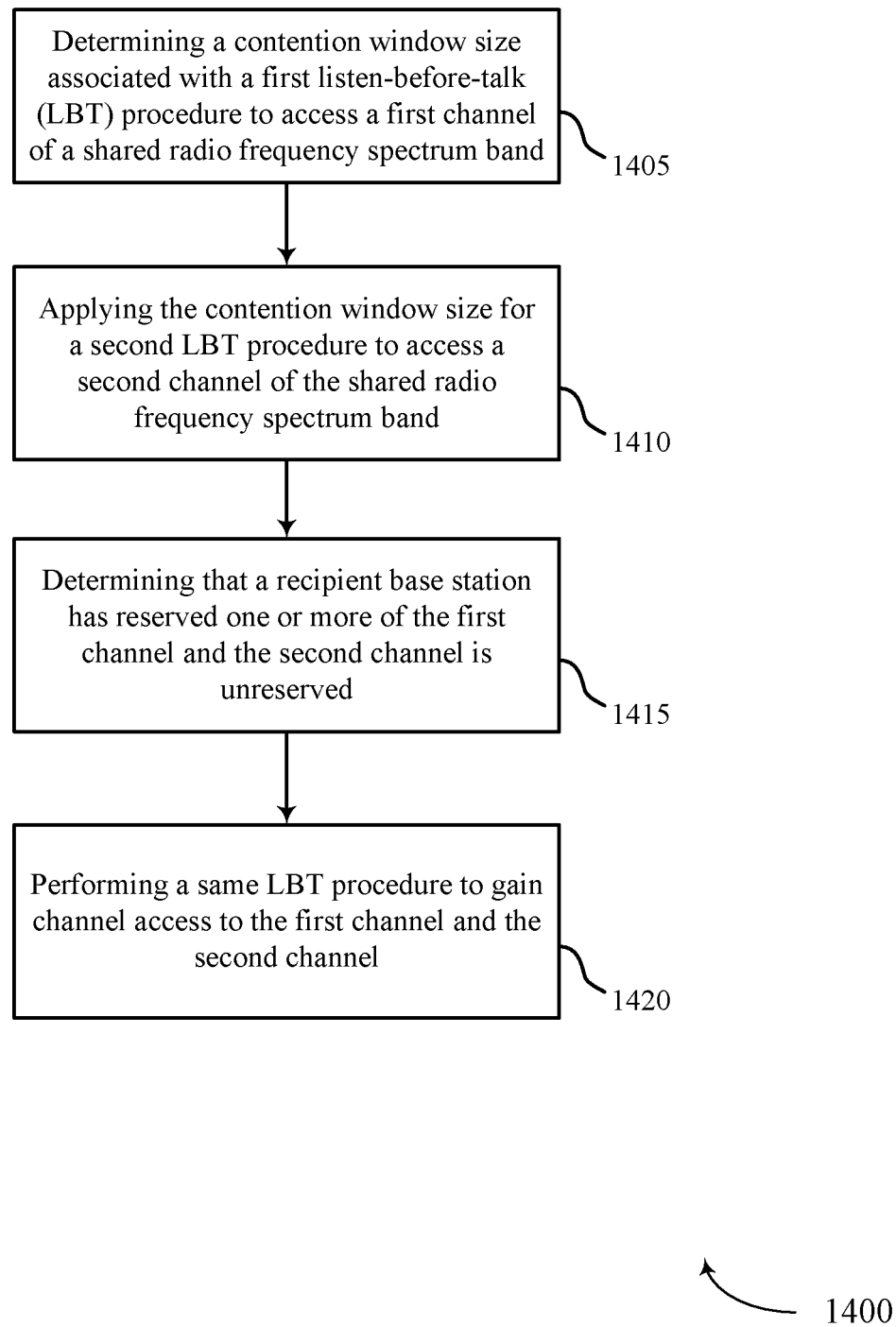

FIG. 14 illustrates a method 1400 for techniques for managing medium access to multi-channels of a shared radio frequency spectrum band in accordance with aspects of the present disclosure. The operations of method 1400 may be implemented by a device such as a base station 105, 205, 205-*a*, 305-*a*, 305-*b*, 505, or 1005, a UE 115, 215, 215-*a*, 215-*b*, 215-*c*, 315, 515, or 915, a wireless device 600, wireless device 700, or LBT component 810, as described with reference to FIGS. 1 through 10. For example, the operations of method 1400 may be performed by the LBT component 610, LBT component 710, LBT component 810, LBT component 910, or base station LBT component 1010 as described with reference to FIGS. 6 through 10. In some examples, a base station 105, 205, 205-*a*, 305-*a*, 305-*b*, 505, or 1005, a UE 115, 215, 215-*a*, 215-*b*, 215-*c*, 315, 515, or 915, wireless device 600, wireless device 700, or LBT component 810 may execute a set of codes to control the functional elements of the respective device to perform the functions described below. Additionally or alternatively, aspects the functions described below may be performed using special-purpose hardware. The method 1400 may also incorporate aspects of methods 1100, 1200, and 1300 of FIGS. 11 through 13.

At block 1405, the method may include determining a contention window size associated with a first listen-before-talk (LBT) procedure to access a first channel of a shared radio frequency spectrum band, as described with reference to FIGS. 2 through 5. In some examples, the operations of block 1405 may be performed by the CW size component 720 or 820 as described with reference to FIGS. 7 and 8.

At block 1410, the method may include applying the contention window size for a second LBT procedure to access a second channel of the shared radio frequency spectrum band as described with reference to FIGS. 2 through 5. In some examples, the operations of block 1410 may be performed by the multi-channel CW determination component 725, 825 as described with reference to FIGS. 7 and 8.

At block 1415, the method may include determining that a recipient base station has reserved one or more of the first channel and the second channel is unreserved, as described with reference to FIGS. 2 through 5. In some examples, the operations of block 1415 may be performed by the channel reservation determination component 845 as described with reference to FIG. 8.

At block 1420, the method may include performing a same LBT procedure to gain channel access to the first channel and the second channel, as described with reference to FIGS. 2 through 5. In some examples, the operations of block 1420 may be performed by the CCA component 730 or 830 as described with reference to FIGS. 7 and 8.

Thus, methods 1100, 1200, 1300, and 1400 may provide for techniques for managing medium access to multi-channels of a shared radio frequency spectrum band. It should be noted that methods 1100, 1200, 1300, and 1400 describe possible implementation, and that the operations and the steps may be rearranged or otherwise modified such that other implementations are possible. In some examples, aspects from two or more of the methods 1100, 1200, 1300, and 1400 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE advanced (LTE) are new releases of Universal Mobile Telecommunications System (UMTS) that use E-UTRA. UTRA, E-UTRA, Universal Mobile Telecommunications System (UMTS), LTE, LTE, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE networks, including such networks described herein, the term evolved node B (eNB) may be used to describe the base stations. The wireless communication system or systems described herein may include a heterogeneous LTE/LTE network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) radio frequency spectrum bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and wireless communication subsystem 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications, comprising:
   determining a contention window size associated with a first listen-before-talk (LBT) procedure to access a first channel of a shared radio frequency spectrum band;
   determining one or more of a service priority or a type of channel for data to be transmitted using the first channel or a second channel of the shared radio frequency spectrum band, wherein the contention window size is determined based at least in part on a combination of the service priority or the type of channel of the first channel and the service priority or the type of channel of the second channel; and
   applying the contention window size for a second LBT procedure to access the second channel.

2. The method of claim 1, wherein the contention window size is determined to be shorter for data having higher service priority than for data having lower service priority.

3. The method of claim 1, wherein the contention window size is determined to be shorter for data to be transmitted using a control channel than for data transmitted using a shared channel.

4. The method of claim 3, wherein the contention window size is determined to be shorter for shared channel data including channel condition information than for shared channel data without channel condition information.

5. The method of claim 1, further comprising:
   determining that one or more of the service priority or the type of channel for data to be transmitted using the first channel is different from the service priority or the type of channel for data to be transmitted using the second channel.

6. The method of claim 1, wherein the second channel has one or more of a lower service priority or lower priority than the first channel.

7. The method of claim 6, wherein the contention window size is determined based at least in part on a number of available channels in the shared radio frequency spectrum band, for which an LBT procedure is to be performed.

8. The method of claim 6, wherein the contention window size is determined based at least in part on preconfigured contention window parameters for different service priorities, different types of channel, or a number of channels.

9. The method of claim 6, wherein the contention window size is signaled in an uplink grant to a user equipment (UE).

10. The method of claim 1, further comprising:
performing the first LBT procedure to gain channel access to the first channel for downlink transmissions from a base station to one or more user equipment (UE).

11. The method of claim 1, further comprising:
performing the first LBT procedure to gain channel access to the first channel for uplink transmissions from a user equipment (UE) to a recipient base station.

12. The method of claim 11, wherein the performing the first LBT procedure comprises performing a same LBT procedure for the first channel and the second channel.

13. The method of claim 11, wherein performing the first LBT procedure comprises:
determining that the recipient base station has reserved the first channel and that at least the second channel is unreserved; and
the method further comprising performing the second LBT procedure for the second channel.

14. The method of claim 13, wherein a type of LBT procedure to perform for the first channel and the second channel is signaled in an uplink grant to the UE.

15. The method of claim 13, wherein a type of LBT procedure to perform for the first channel and the second channel is determined based on a configuration of one or more base stations other than the recipient base station.

16. The method of claim 13, wherein an LBT procedure is not performed for each reserved channel.

17. The method of claim 11, wherein performing the first LBT procedure comprises:
determining that the recipient base station has reserved the first channel and the second channel; and
the method further comprising performing the second LBT procedure for the second channel.

18. The method of claim 17, wherein the contention window size for the first LBT procedure is set to a minimum contention window size.

19. An apparatus for wireless communications, comprising:
means for determining a contention window size associated with a first listen-before-talk (LBT) procedure to access a first channel of a shared radio frequency spectrum band;
means for determining one or more of a service priority or a type of channel for data to be transmitted using the first channel or a second channel of the shared radio frequency spectrum band, wherein the contention window size is determined based at least in part on a combination of the service priority or the type of channel of the first channel and the service priority or the type of channel of the second channel; and
means for applying the contention window size for a second LBT procedure to access the second channel.

20. An apparatus for wireless communications, comprising:
a processor;
memory in electronic communication with the processor; and
the processor and memory configured to:
determine a contention window size associated with a first listen-before-talk (LBT) procedure to access a first channel of a shared radio frequency spectrum band;
determine one or more of a service priority or a type of channel for data to be transmitted using the first channel or a second channel of the shared radio frequency spectrum band, wherein the contention window size is determined based at least in part on a combination of the service priority or the type of channel of the first channel and the service priority or the type of channel of the second channel; and
apply the contention window size for a second LBT procedure to access the second channel.

21. The apparatus of claim 20, wherein one or more of the service priority or the type of channel for data to be transmitted using the first channel is different from the service priority or the type of channel for data to be transmitted using the second channel.

22. The apparatus of claim 20, wherein the second channel has one or more of a lower service priority or a lower priority type of channel than the first channel.

23. The apparatus of claim 22, wherein the contention window size is determined based at least in part on a number of available channels in the shared radio frequency spectrum band, for which an LBT procedure is to be performed.

24. The apparatus of claim 22, wherein the contention window size is determined based at least in part on preconfigured contention window parameters for different service priorities, different types of channel, or a number of channels.

25. The apparatus of claim 22, wherein the contention window size is signaled in an uplink grant to a user equipment (UE).

26. The apparatus of claim 20, wherein the processor and memory are further configured to:
perform the first LBT procedure to gain channel access to the first channel for downlink transmissions from a base station to one or more user equipment (UE).

27. The apparatus of claim 20, wherein the processor and memory are further configured to:
perform the first LBT procedure to gain channel access to the first channel for uplink transmissions from a user equipment (UE) to a recipient base station.

28. A non-transitory computer-readable medium storing code for wireless communications, the code for causing at least on processor to:
determine a contention window size associated with a first listen-before-talk (LBT) procedure to access a first channel of a shared radio frequency spectrum band;
determine one or more of a service priority or a type of channel for data to be transmitted using the first channel or a second channel of the shared radio frequency spectrum band, wherein the contention window size is determined based at least in part on a combination of the service priority or the type of channel of the first channel and the service priority or the type of channel of the second channel; and
apply the contention window size for a second LBT procedure to access Flail the second channel.

* * * * *